Figure 6:
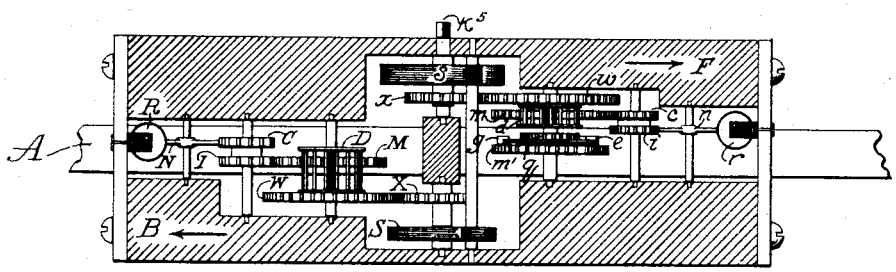

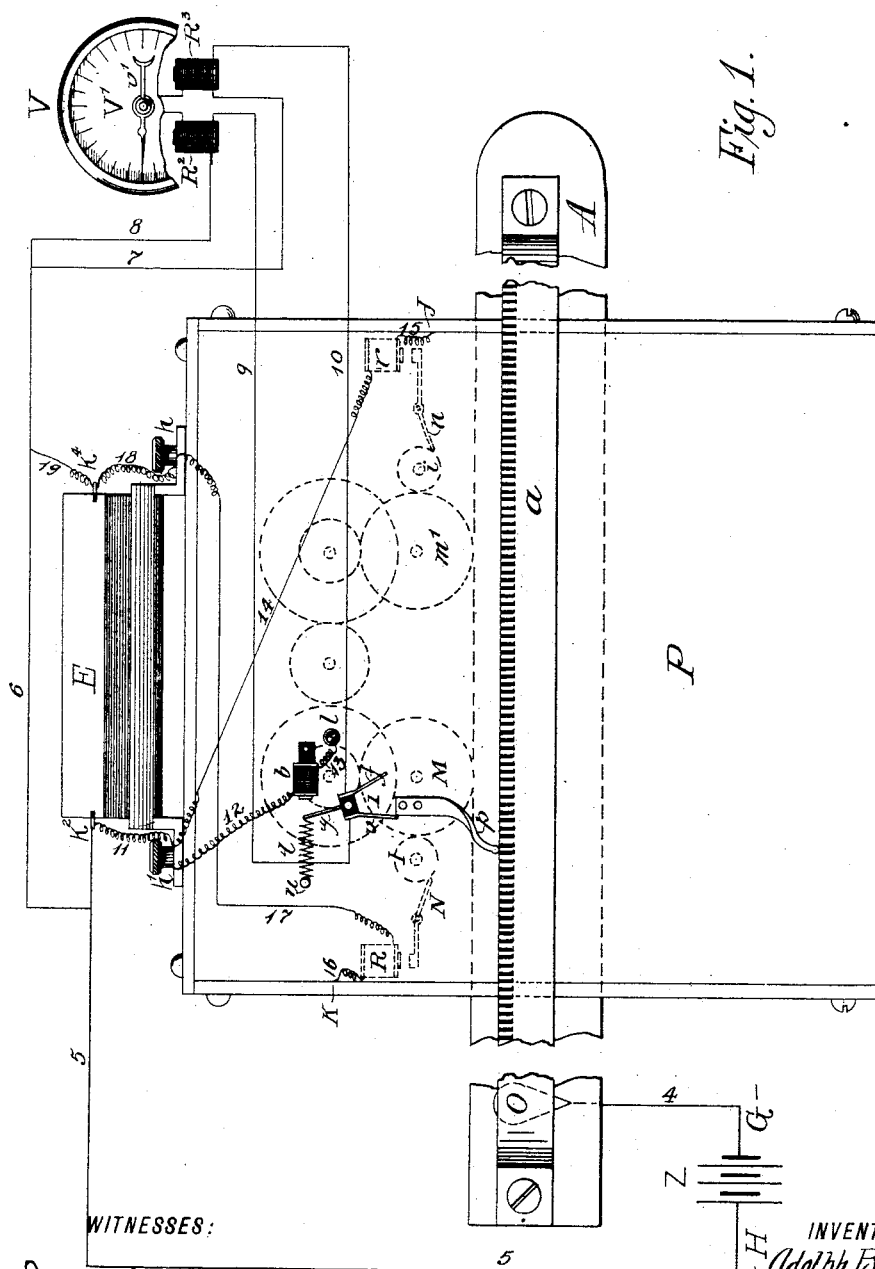

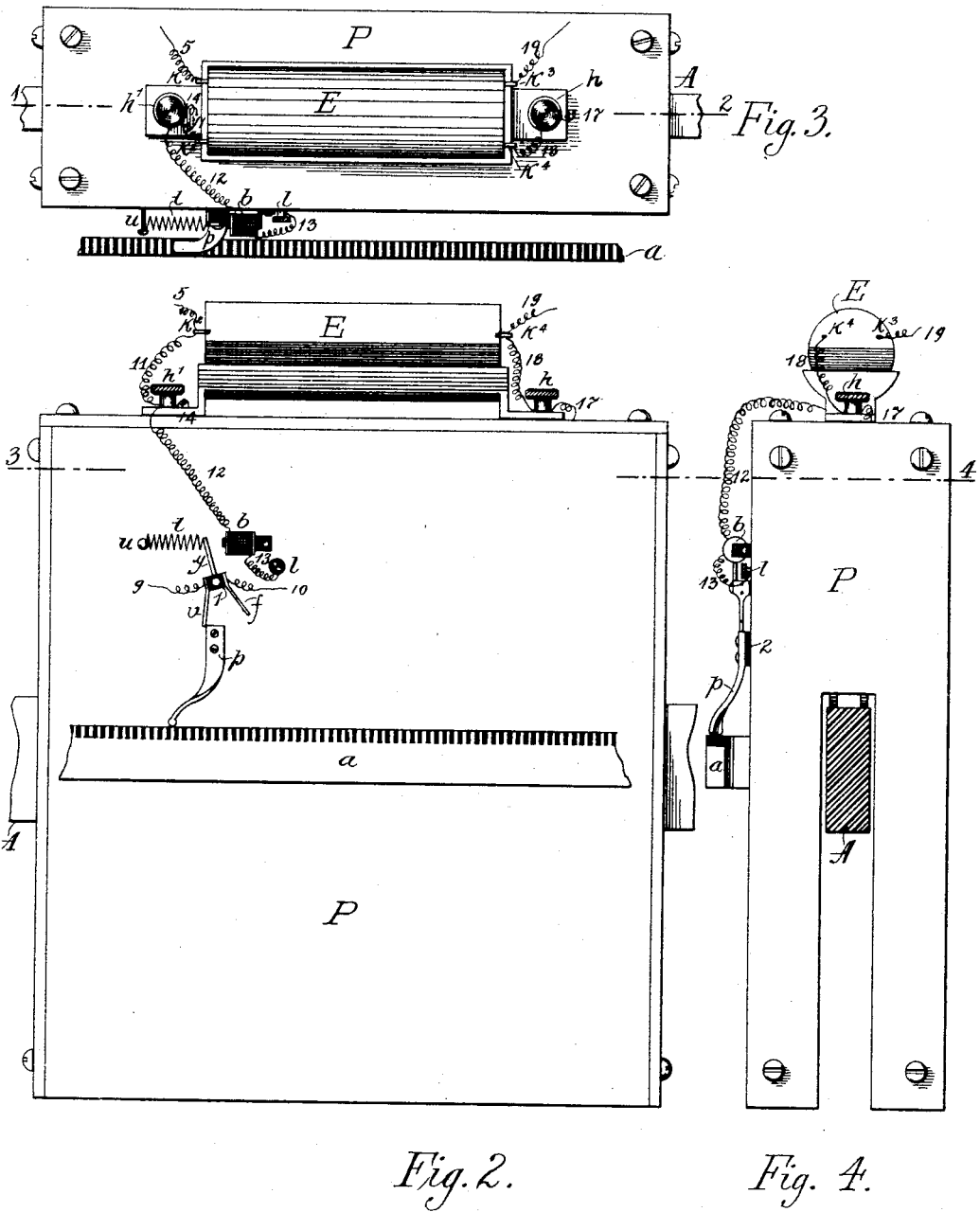

(No Model.) 5 Sheets—Sheet 3.

A. B. RÖVER.
AUTOMATIC WEIGHING SCALE AND INDICATOR.

No. 446,208. Patented Feb. 10, 1891.

WITNESSES:
Carleton Elwell
Walter A. Brown

INVENTOR
Adolph Bruno Röver.
BY Edwin C. Shaw
Arthur B. Brown
his ATTORNEYS.

(No Model.)   5 Sheets—Sheet 4.
A. B. RÖVER.
AUTOMATIC WEIGHING SCALE AND INDICATOR.
No. 446,208.   Patented Feb. 10, 1891.

WITNESSES:
Carleton E. Snell,
Walter A. Brown

INVENTOR
Adolph Bruno Röver.
BY Edwin J. Shaw and
Arthur E. Browne
his ATTORNEYS.

(No Model.) 5 Sheets—Sheet 5.
A. B. RÖVER.
AUTOMATIC WEIGHING SCALE AND INDICATOR.

No. 446,208. Patented Feb. 10, 1891.

WITNESSES:
Carleton E. Snell
Walter A. Brown

INVENTOR
Adolph Bruno Röver.
BY Edwin C. Shaw
Arthur H. Brown
his ATTORNEYS.

UNITED STATES PATENT OFFICE.

ADOLPH BRUNO RÖVER, OF BINGHAMTON, NEW YORK.

AUTOMATIC WEIGHING-SCALE AND INDICATOR.

SPECIFICATION forming part of Letters Patent No. 446,208, dated February 10, 1891.

Application filed September 27, 1890. Serial No. 366,323. (No model.)

*To all whom it may concern:*

Be it known that I, ADOLPH BRUNO RÖVER, of Binghamton, in the county of Broome and State of New York, have invented certain new and useful Improvements in Automatic Weighing-Scales and Indicators Therefor, of which the following is a specification.

Prior to the present invention weighing-scales have been provided with automatically-moving poises so constructed and arranged that when an article is placed upon a scale the poise will automatically start and travel along the scale or balance beam until it balances the article on the scale. When this point of equilibrium is reached, the movement of the poise ceases and its position of rest indicates the weight of the article. When the article is removed from the scale, the poise automatically resumes its normal or "zero" position. Such automatically-moving poises have been provided with motor mechanism for moving the poise back and forth, and the movement of the poise has been initiated and arrested by electrical devices which act to stop the movement of the poise whenever the balance or scale beam is in equilibrium, and to release and hence start the poise whenever the balance or scale beam is out of equilibrium. As examples of such prior automatically-acting and electrically-controlled poises applied to a balance or scale beam, reference may be had to United States Letters Patent to Henry Fairbanks, No. 110,963, dated January 17, 1871; to Edwin R. Puffer, No. 323,885, dated August 5, 1885, and to William Snelgrove, No. 413,331, dated October 22, 1889.

Now the present invention relates to automatic scales of this character, and the improvements comprising the invention are of a twofold character.

The first character of improvements consists in the construction and operation of the automatically-acting poise, and the second character of improvements consists in appliances whereby the movements of the poise are indicated at a place (or places) distant from the location of the scales. In the present invention the movements of the poise are controlled by electrical means, and the indications on a distant indicator of the position of the poise are also effected by electrical means.

The present improvements are applicable to any of the various styles of scales or weighing-machines now in use which are provided with a balance-beam, and they may be applied to scales having one or more balance-beams and one or more poises. For the purposes of illustration and description, however, the improvements will be set forth in connection with a weighing apparatus having but a single scale-beam and a single poise thereon, and since the present improvements are in no wise affected by the construction of the weighing apparatus only the scale-beam thereof will be illustrated.

The present improvements are illustrated in the accompanying drawings, wherein—

Figure 5:
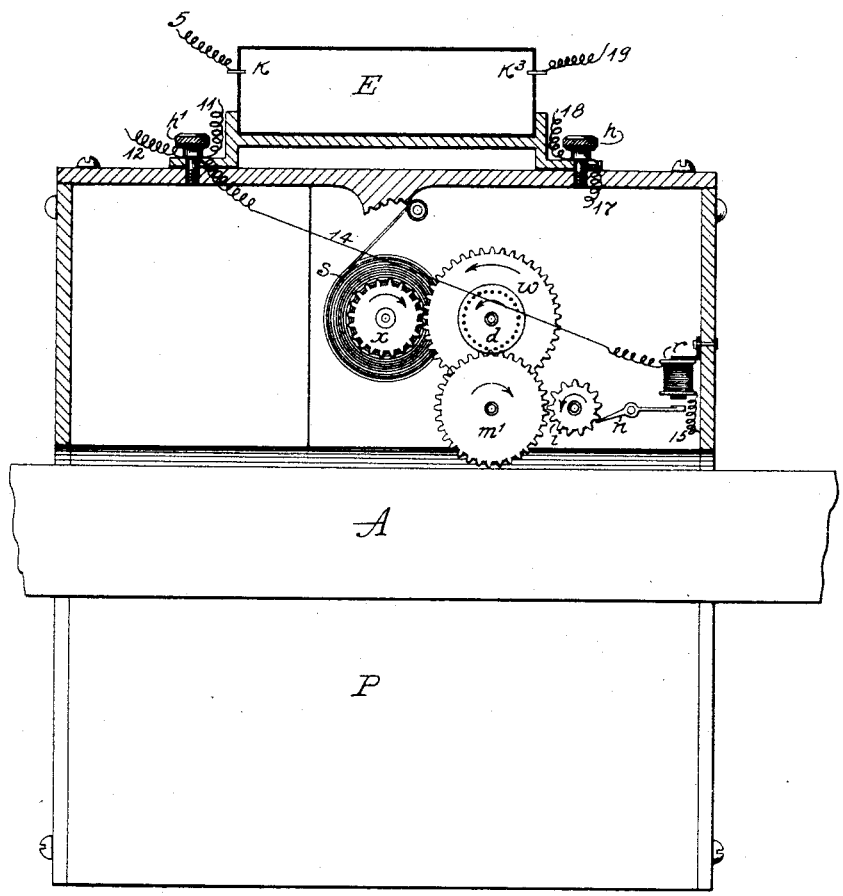
Figure 9:
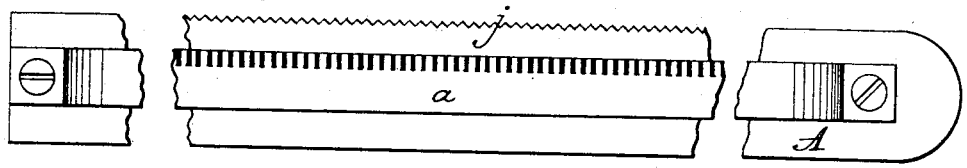
Figure 8:
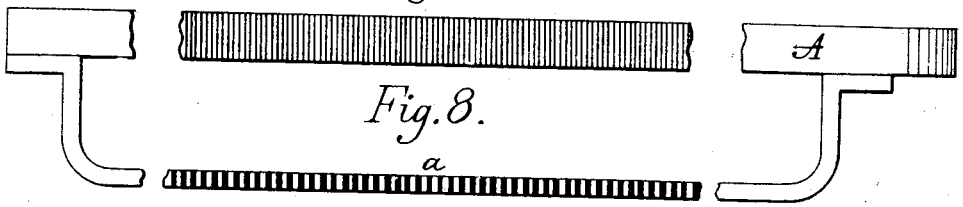
Figure 7:
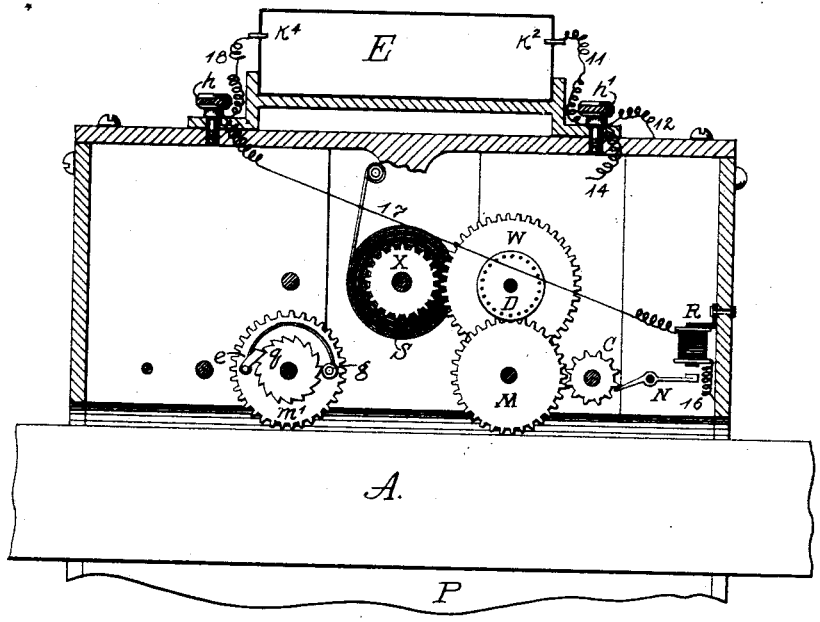
Figure 10:
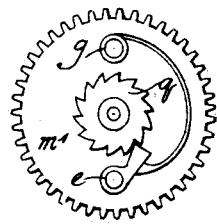
Figure 11:
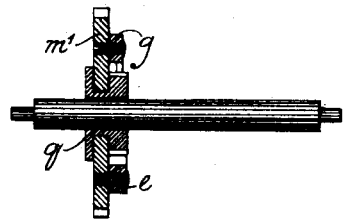
Figure 12:
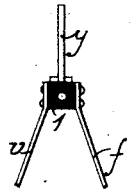
Figure 13:
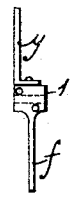

Figure 1 is a side view of a balance-beam with the improved automatically-acting poise thereon, this figure also showing diagrammatically the electrical connections with the electric generator and the distant indicator and showing the operative mechanism of the poise in dotted lines. Fig. 2 is a side view of the poise alone. Fig. 3 is a top view of the poise. Fig. 4 is an end view of the poise, showing the balance-beam in vertical section. Fig. 5 is a vertical longitudinal section of the poise in a plane indicated by the line 1 2 in Fig. 3 and looking in one direction. Fig. 6 is a horizontal section of the poise in a plane indicated by the line 3 4 in Figs. 2 and 4. Fig. 7 is a view similar to Fig. 5, but looking in the opposite direction. Fig. 8 is a plan view of the balance-beam. Fig. 9 is a side view of the balance-beam. Figs. 10 and 11 are details of the motor mechanism of the poise. Figs. 12 and 13 are detail views of a circuit-closer employed.

First will be described the mechanical construction of the poise; secondly, the electrical connections and devices whereby the movements of the poise are controlled, and, thirdly, the devices whereby the movements of the poise are indicated on a distant indicator.

Referring to the drawings, A is a metallic scale or balance-beam, O is the fulcrum thereof, and P is the metallic poise which slides back and forth on the scale-beam. The poise itself is essentially a hollow box, the walls of which are of metal, and it incloses the motor mechanism for moving the poise on the scale-beam. As shown in Fig. 4, the lower portion of the poise is divided so that it straddles the scale-beam, this construction enabling the poise to be properly maintained on and guided by the scale-beam. The poise is moved in opposite directions by two spring-motors having drive-wheels M m', respectively, which travel upon the upper surface of the scale-beam A These drive-wheels support the poise upon the beam, and are adapted to be rotated in opposite directions, so that when one drive-wheel, as M, is in operation (the other m' being then idle) the poise is driven in one direction, and when the other drive-wheel m' is in operation (the first drive-wheel M being idle) the poise is driven in the opposite direction. In order that there may be no slipping of the drive-wheels upon the scale-beam, the upper surface of the scale-beam may be provided with teeth or cogs $j'$, (see Fig. 9,) but ordinarily it will be found that the poise will be driven with sufficient accuracy if the upper surface of the scale-beam is plain, as shown in Figs. 1, 6, and 7.

The drive-wheel M is rotated by a train of gearing which is best shown in Fig. 7 and at the left in Fig. 6. The power is supplied by a coiled spring S, attached at opposite ends to a fixed pin and to a rotary arbor, which carries a pinion X. The pinion X engages a gear-wheel W, the rotary arbor of which carries a lantern-wheel D, which in turn engages the driving-wheel M. When, therefore, the spring S is free to act, the wheel M is rotated and the poise is driven in the direction indicated by the arrow at the left in Fig. 6. The normal position, however, of the poise is a state of rest, and accordingly provision is made for locking the train of gearing controlled by spring S. For this purpose the drive-wheel also engages a pinion I, (see Fig. 6,) the rotary arbor of which also carries a ratchet-wheel C, with which co-operates a locking-pawl N. This pawl while in engagement with ratchet C locks the train of gearing and prevents the rotation of drive-wheel M in the proper direction to drive the poise; but it permits the rotation of the wheel M in the opposite direction. Before, therefore, the wheel M can become operative to drive the poise the pawl N must be disengaged from the ratchet C. The manner in which the pawl is thus disengaged will be set forth hereinafter, as will also be set forth the manner in which the spring S is rewound.

The train of gearing operating the drive-wheel M is located at one end of the poise, while the gearing for operating the other drive-wheel m' is located at the other end of the poise. The latter gearing is best shown in Fig. 5 and at the right in Fig. 6. Power is furnished by a coiled spring s, attached at opposite ends to a fixed pin and to a rotary arbor which carries a pinion x. The pinion x engages a gear-wheel w, the rotary arbor of which carries a lantern-wheel d. This lantern-wheel d engages with a pinion m, rigidly attached to a rotary arbor, and on this rotary arbor the driving-wheel m' is loosely mounted. To this same arbor, however, is rigidly attached a ratchet-wheel q. (See Figs. 7 and 10.) The driving-wheel m' carries a pivoted pawl e, which is held in engagement with the ratchet-wheel q by a spring g, also carried by the wheel m'. When, therefore, the spring s acts upon its train of gearing, the ratchet q acts upon the pawl e, and consequently drives the poise in the direction indicated by the arrow F in Fig. 6.

Since both the wheels M m' are at all times in engagement with the scale-beam A, it follows that each must be permitted to rotate in a direction opposite to that in which it rotates when driving the poise. This backward rotation of wheel m' is permitted by its loose mounting on its arbor and its connection therewith by the pawl e and ratchet q, which permit it to rotate backward without affecting its driving-gearing. The driving-wheel M, however, has no such provision permitting its backward movement. It is rotated backward, however, by reason of the fact that the spring s is many times more powerful than the spring S. Therefore when the spring s is in action it is powerful enough to rotate the driving-wheel M backward, and thereby rewind the spring S. The spring s is rewound by a winding-boss $k^5$ and a key. By using a spring of sufficient power one winding will be sufficient to drive the poise many times.

In order to lock the gearing operated by the spring s when the poise is in its normal state of rest and while the poise is being driven by spring S, the pinion m engages with a pinion c, (see Fig. 6,) the rotary arbor of which also carries a ratchet-wheel i, with which co-operates a locking-pawl n. This pawl while in engagement with ratchet i locks the train of gearing controlled by spring s. In order, therefore, to permit the action of the spring s, the pawl n must be disengaged from the ratchet i. It is therefore clear that under normal conditions the poise will remain at rest, and that to move it in either direction it is only necessary to disengage from their respective ratchet-wheels the pawl n or the pawl N, as the case may be.

The means employed (which are identical) for releasing the pawls n N, so as to weigh automatically, are based upon the facts that when the balance or scale beam is in equilibrium it occupies a horizontal position. When a weight is placed on the scale, the balance-beam moves upwardly, thus destroying the horizontal position, and when a weight is taken off the scale the balance-beam swings downward below its horizontal position.

The movements of the pawls n N are immediately controlled by co-operating magnets r R, respectively, each pawl being on a lever carrying the armature of one of the magnets. Under normal conditions the magnets are inactive; but when an electric current passes through one of the magnets the corresponding pawl is disengaged from its ratchet, and the motor mechanism locked by it is thus free to drive the poise.

In order that the proper motor may drive the poise when a weight is placed on the scale or is removed therefrom, the following electric circuit-controlling devices are employed.

The poise P carries a receptacle or level E, the shell of which consists of a horizontally-extending non-conductive tube, (a glass tube, for example,) which is partly filled with any suitable conductive fluid, such as quicksilver, or, to avoid expansion, acidulated water. When the poise is in equilibrium, as when at the zero-point of the scale-beam, or when it just balances a weight on the scale, the level of the conductive liquid will be exactly parallel with the axis of the tube E. At one end of the tube E two electrodes $k\ k^2$ extend through the end wall, and at the other end of the tube two other electrodes $k^3\ k^4$ extend through the end wall. All of the inwardly-extending ends of these two pairs of electrodes are located in the same plane, and when the poise is in equilibrium they are all above the level of the conductive liquid. If, however, the balance-beam is tipped upwardly (as by placing a weight on the scale) the pair of electrodes $k\ k^2$ at one end of the beam become submerged in the conductive fluid, and consequently an electric circuit of which these two electrodes are the terminals, is closed. This electric circuit is as follows: Z is the electric generator, and its positive pole H is connected with the electrode $k$ by an electric conductor 5. (See Figs. 1 and 3.) The opposite pole G of the generator is connected by conductor 4 with the metallic beam A, and thence through the metallic motor-gearing to the metal frame-work of the poise P. The metal frame-work of the poise is connected by wire 15 (see Figs. 1 and 5) with the coils of magnet $r$, (the magnet being mounted on an insulated support, as shown in Fig. 6.) The magnet $r$ is also connected by wire 14 to binding-post $h'$, which in turn is connected by wire 11 with the other electrode $k^2$. The closing of the electric circuit of which the electrodes $k\ k^2$ are the terminals by the upward tipping of the scale-beam when an article is placed on the scale thus excites magnet $r$, which, acting upon pawl $n$, unlocks the motor controlled by spring $s$. The poise is thus driven along the scale-beam away from its fulcrum O until the poise balances the article placed on the scale. As soon as equilibrium is thus established the level of the conductive liquid again assumes its normal position, the circuit through electrodes $k\ k^2$ is broken, the magnet $r$ is demagnetized, and consequently the movement of the poise is stopped. The poise then indicates by its position on the scale-beam the weight of the article on the scale. When, however, the article is removed from the scale, the balance-beam, under the weight of the poise, tips downwardly, and as a consequence the other pair of electrodes $k^3\ k^4$ becomes submerged in the conductive liquid, whereby the electric circuit of which these electrodes are the terminals is closed. The electrode $k^3$ (see Figs. 3 and 1) is connected by conductors 19, 6, and 5 with one pole of the battery. The electrode $k^4$ is connected to the other pole of the battery as follows: By conductor 18 to binding-post $h$, (see Fig. 3,) from thence by conductor 17 to electro-magnet R, which is insulated by its supports from the poise, as shown in Fig. 7, thence from magnet R by wire 16 to the metal frame of the poise, and thence by beam A, its fulcrum O, and conductor 4 to the battery Z. The closing of the electric circuit of which the electrodes $k^3\ k^4$ are the terminals by the downward tipping of the scale-beam, due to the removal of an article from the scale, thus excites magnet R, which, acting upon pawl N, unlocks the motor controlled by spring S. The poise is thus driven along toward the fulcrum O until the poise again reaches the zero-point on the scale-beam. As soon as equilibrium is thus again established the conductive liquid again assumes its normal position relatively to the tube E, the circuit through electrodes $k^3\ k^4$ is again broken, the magnet R is demagnetized, and consequently the movement of the poise is stopped.

Except for the occasional winding of the spring $s$, it will be seen that the action of a scale provided with the present improvements is wholly automatic. When an article is placed on the scale, the poise at once and automatically travels along the balance-beam until it balances the article, and consequently indicates by its position the correct weight of the article. The poise then stops automatically and remains in position until the article is removed from the scale, when the poise at once and automatically returns to the zero-point of the scale-beam.

The distinctive and characteristic features of the improved poise may be enumerated as follows: first, the motor mechanism consisting of two spring-motors adapted to drive the poise in opposite directions and one spring acting to wind the other up; second, the electric appliances, the sole function of which is to lock and release the motors, and, third, the tube containing a conductive fluid for making and breaking the circuits which control the action of the spring-motors. It only remains, therefore, to describe the instrumentalities whereby the movements of the poise are transmitted to and indicated at a place or places distant from the place where the scale is located. For this purpose an electrical indicator V is employed at the place to which the indications are to be transmitted. This indicator V (see Fig. 1) may be constructed like any of the well-known electrical indicating-instruments, of which there are many suitable for this purpose. Such instruments are provided with a suitably-graduated dial V', with which co-operates an index v', capable of a step-by-step rotation in opposite directions. The step-by-step movements of the index v' in opposite directions are effected by two electro-magnets $R^2 R^3$ and intervening mechanism, which is not shown because old and well known. It is sufficient to know that when one magnet $R^2$ is excited the index v' is moved one step in one direction, and when the other magnet $R^3$ is excited the index v' is moved one step in the opposite direction. The only respect in which an ordinary instrument of this character would have to be changed to render it suitable for use in connection with the present invention would be to make its dial so as to indicate units of weight. Now the step-by-step movements of the index v' are controlled by the movements of the poise by the making and breaking of the two electric circuits which include, respectively, the two electro-magnets $R^2 R^3$. To accomplish this result there is secured to the balance-beam A a metal bar a outside of the poise P, in close proximity thereto, and extending in a line parallel with the beam A. The upper surface of this bar is divided into alternating conductive and non-conductive sections by means of the insertion into the upper surface of the metallic bar of a series of small blocks or pieces of insulating material, such as hard rubber, as indicated in Figs. 1, 8, and 9. The insulating-blocks are located at equal distances apart, and there is one of the blocks for each unit of weight. Co-operating with the upper surface of the metallic bar a is a trailing contact or brush p, which is carried by the poise P, but insulated therefrom by the insulation 2. (See Fig. 4.) Whenever this contact or brush rests upon one of the metallic sections of the bar a between the non-conductive blocks or sections, said contact or brush will be in electrical communication with one pole G of the electric generator Z by means of the bar a, beam A, fulcrum O, and conductor 4. When, however, the contact or brush p is in contact with one of the insulated sections or blocks, the circuit which includes the contact or brush p will be broken, and it will be evident that in whichever way the poise travels the electric circuit which includes the contact or brush will be made and broken as many times as there are units of weight included in the travel of the poise. Accordingly it will be understood that in order that the indicator V may indicate the position of the poise at any time it is only necessary that one of the magnets $R^2$ should be in circuit with the contact or brush p when the poise is traveling in one direction, and that the other magnet $R^3$ should be in circuit with the contact or brush p when the poise is traveling in the opposite direction.

The magnet $R^2$ is connected with the pole H of generator Z by conductors 5 6 8, and the magnet $R^3$ is connected with the same pole by wires 5, 6, and 7, the two magnets being thus connected in multiple. The magnet $R^2$ is further connected by the return-conductor 9 to one electrode v of a circuit-changer 1, (see Figs. 11 and 12,) and the magnet $R^3$ is connected by the return-conductor 10 to a second electrode f of the circuit-changer. The circuit-changer 1 is pivotally mounted upon but insulated from the frame of the poise, so that its two electrodes f v can be brought in turn into electrical contact with the trailing contact or brush p. Normally one of the electrodes, as v, is held in contact with brush p by a spring t, fastened at opposite ends to the fixed stud u and the end of a lever-arm y, carried by the circuit-changer 1. As shown, the electrode v is in contact with the brush p (and consequently the magnet $R^2$ is in circuit) when the poise is traveling backward or toward the fulcrum O, so that the index v' is moved one step backward on the dial as the brush p passes each metallic section on the bar a.

In order to shift the position of the circuit-changer 1 and so bring the other magnet $R^3$ into circuit with the brush p, the conductive liquid in tube E and the electrodes k $k^2$ are utilized. An electro-magnet b, of which the lever-arm y of the circuit-changer is the armature, (or the armature of which is carried by the lever-arm y,) is opposed to spring t. This magnet b is carried by and insulated from the poise P, (see Figs. 1 and 4,) and is included in the same circuit as the electrodes k $k^2$ by conductor 12, which connects the magnet b with binding-post h', (and thence by conductor 11 to $k^2$,) and by conductor 13, which connects it with the metal frame of the poise. When, therefore, an article is placed on the scale and a balance-beam is tipped up, thereby causing the outward travel of the poise P, a current is simultaneously sent through magnet b, thereby attracting the armature y and bringing the electrode f into contact with brush p. Accordingly after once placing the index v' at the zero-point on the indicator to correspond with the zero position of the poise on the balance-beam the index will be moved in exact accordance with the movements of the poise, and consequently the indicator will always indicate the position of the poise. When the outward movement of the poise ceases, owing to the circuit being broken through the electrodes k $k^2$, the magnet b will be simultaneously demagnetized and the reversing-magnet $R^2$ will be brought into circuit with brush p by the action of the counter-spring t.

The indicator, in connection with the automatic weighing apparatus, is particularly useful for indicating the weights of freight-cars and of coal-carts and for other purposes where the person who notes the weights cannot conveniently be present where the scale is located. It will be noted that it is not essential that the poise should return each time to the zero-point before another article is placed on the scale, so that the apparatus can be conveniently used for indicating the weights of successive cars passing over a platform-scale.

It is evident that the weights determined by the poise P may be transmitted simultaneously to a plurality of indicators at different offices by simply arranging a plurality of indicators in series in the same electric circuits.

All or a part of the wire-connections may be replaced by rods for electric conductors.

I claim as my invention—

1. A pivoted balance-beam, in combination with a poise traveling thereon, said poise having two independent and oppositely-acting spring-motors for moving said poise in opposite directions, one of said motors being idle when the other is in operation, substantially as set forth.

2. A pivoted balance-beam and a poise traveling thereon, said poise having two independent and oppositely-acting spring-motors for moving said poise in opposite directions, one of said motors being idle when the other is in operation, in combination with locking devices for locking said motors, and means controlled by the movements of said balance-beam for unlocking said motors, substantially as set forth.

3. A pivoted balance-beam and a poise traveling thereon, said poise having two independent and oppositely-acting spring-motors for moving said poise in opposite directions, one of said motors being idle when the other is in operation, in combination with two locking-pawls which normally lock said motors, two electro-magnets for withdrawing said pawls, respectively, and releasing said motors, and two normally-open electric circuits including said magnets, respectively, one of said circuits being closed when the balance-beam is tipped above its level position and the other of said circuits being closed when the balance-beam is tipped below its level position, substantially as set forth.

4. A balance-beam and a poise traveling thereon, in combination with a receptacle partaking of the movements of the balance-beam, said receptacle containing a conductive liquid, and electrodes carried by said receptacle, which are immersed in and withdrawn from said conductive liquid by the movements of said balance-beam, substantially as set forth.

5. A balance-beam and a poise traveling thereon, said poise having two independent and oppositely-acting spring-motors for moving said poise in opposite directions, one of said motors being idle when the other is in operation, two locking-pawls which normally lock said motors, and two electro-magnets for withdrawing said pawls, respectively, and releasing said motors, in combination with a receptacle mounted on said poise and containing an electric conductive liquid, and two electrodes at each end of said receptacle, said electrodes having the following characteristics: (a) the two electrodes at one end of said receptacle constitute the two terminals of an electric circuit which includes an electric generator and one of said electro-magnets; (b) the two electrodes at the other end of said receptacle constitute the two terminals of an electric circuit which includes an electric generator and the other of said electro-magnets; (c) when said balance-beam is in equilibrium none of said electrodes are in electrical communication with said conductive liquid; (d) when said balance-beam is tipped in one direction the two electrodes at one end of the said receptacle are both brought into electrical communication with said conductive liquid, and (e) when said balance-beam is tipped in the opposite direction the two electrodes at the other end of said receptacle are brought into electric communication with said conductive fluid, substantially as set forth.

6. The traveling poise which opens and closes an electric circuit for each unit of distance that it travels, in combination with an electric indicator having a controlling-magnet in the circuit controlled by said poise, substantially as set forth.

7. The reciprocating poise which opens and closes an electric circuit for each unit of distance that it travels in either direction, in combination with an electric indicator having two oppositely-acting controlling electro-magnets, one of which is in the electric circuit controlled by said poise when said poise is moving in one direction, and the other of which is in said electric circuit when said poise is moving in the opposite direction, substantially as set forth.

8. The balance-beam, the bar $a$, attached thereto, divided into electro conductive and non-conductive sections representing units of weight, the reciprocating poise which moves back and forth on said beam, and an electrical contact or brush carried by said poise which comes successively in contact with said sections, said brush and said conductive sections constituting the terminals of an electric circuit which includes an electric generator, in combination with said electric generator, an electric indicator having two oppositely-acting controlling electro-magnets, and a circuit-changer which brings one said electro-magnets into circuit with said brush and generator when said poise is traveling in one direction, and which brings the other of said electro-magnets into circuit with said brush and generator when said poise is traveling in the opposite direction, substantially as set forth.

9. The balance-beam, the bar $a$, attached thereto, divided into electro conductive and non-conductive sections representing units of weight, the reciprocating poise which moves back and forth on said beam, an electrical contact or brush $p$, carried by said poise which comes successively into contact with said sections, an electric generator, an electro-magnet $b$, carried by the poise, a receptacle carried by said poise and containing an electro-conductive fluid, two electrodes mounted on said receptacle, which constitute the two terminals of an electric circuit including said generator, one of said electrodes being connected with one pole of the generator by electric conductors, and the other electrode being connected with the opposite pole of said generator by electric circuit-connections which include said electro-magnet $b$, and both of said electrodes being normally out of electrical communication with said conductive liquid, but adapted to be immersed therein when said beam tips in one direction, in combination with a circuit-changer having an operating-arm $y$, constituting the armature of said magnet $b$, means (such as a spring) for retracting said arm from said magnet, and said circuit-changer having two electrodes, one of which is brought into electric communication with said brush $p$ when said arm $y$ is acted upon by said magnet $b$, and the other of which electrodes is brought into electric communication with said brush when said arm $y$ is acted upon by the force opposing said magnet, and an electric indicator having two oppositely-acting controlling electro-magnets connected in multiple with said generator, one of said magnets being connected with one electrode of said circuit-changer and the other of said magnets being connected with the other electrode of said circuit-changer, substantially as set forth.

In witness whereof I have hereunto signed my name in the presence of two subscribing witnesses.

ADOLPH BRUNO RÖVER.

Witnesses:
EDWARD K. CLARK,
A. M. SPERRY.